3,181,324
LUBRICANT PAD FOR EXTRUDING
HOT METALS
Dominick Labino, Grand Rapids, Ohio, assignor to Johns-Manville Corporation, New York, N.Y., a corporation of New York
No Drawing. Filed Feb. 28, 1963, Ser. No. 261,856
9 Claims. (Cl. 72—42)

This invention relates to the extrusion of metals and metal alloys having high melting points and which accordingly require high extrusion temperatures and pressures. More particularly, the invention relates to a lubricating pad which may be used in conjunction with extrusion dies for such high melting point metals.

A large number of metals and alloys such as lead, zinc, aluminum and the like have relatively low melting points which readily lend themselves to extrusions in a heated state. On the other hand, certain other metals or alloys which have a lesser degree of malleability, as for example tungsten and molybdenum, can be commercially extruded or prepared only under very high pressures and temperatures, and because of the necessity of such high pressures and temperatures the die is subjected to rapid degradation. This difficulty is due chiefly to the heating of the dies and the friction which they undergo, as well as to the friction occurring between the work piece, such as a billet, to be extruded, and the container. This friction not only causes erosion, wear and deterioration of the dies, containers and mandrels, but also considerably increases the energy necessary for the extrusion and results in defects in the products obtained.

Heretofore, because of the disadvantages mentioned above, the extrusion of these metals having high melting points necessitate frequent repair of the dies and other equipment whereby the efficiency of the technique is lessened. Furthermore, the surface of the extruded goods was often not satisfactory in that it was not as smooth as required. To overcome this difficulty, various devices have been employed as an aid to the extrusion process and while successful for some techniques, they have not proven completely satisfactory in extruding these higher melting point materials. The use of lubricants such as oil, either alone or mixed with graphite and the like is illustrative of techniques which have not produced satisfactory products. Similar unsatisfactory results have been obtained with other extrusion aids or lubricating materials such as talc or calcium carbonate.

One of the earliest attempts to alleviate this problem is set forth in U.S. Letters Patent No. 2,538,912, issued January 23, 1951, to Sejournet et al. Therein the patentees suggest that a material of an incombustible but fusible nature having a wide melting range as contrasted to a true melting point be inserted between dies and the heated work piece. Of the materials employed by the patentees, glass slag and a certain group of salts such as sodium borate and sodium silicates are disclosed.

Subsequently, it was determined that the use of such materials was not completely satisfactory. In the first place fragments of broken glass were carried to various points of the extruding apparatus and resulted in premature wear due to their abrasive action. Moreover, the lubricating effect of this method gradually diminished as the temperature of the billet fell due to the increased pressures expelled the molten glass from between the adjacent surfaces of the billet and the die plate.

Consequently, further advances employed parcels of glass fibers. These parcels could be used in conjunction with glass plates or could be used completely independently of such plates. Specifically, the purposes of the glass fiber were to act as a cushion to overcome the difficulty with the breaking of the glass plates and to provide a source of lubricant by having the fibers themselves melt and form the lubricating ingredient. This technique may be represented by U.S. Letters Patent Nos. 2,630,220, issued on March 3, 1953 to Sejournet and 2,706,850 issued on April 26, 1955 to Sejournet et al.

However, this approach proved to have certain disadvantages and it was subsequently devised, rather than using a solid plate of glass or glass fiber parcels, that a glass disc be used composed of powdered glass agglomerated by a binder material such as sodium silicate. U.S. Letters Patent No. 2,946,437, issued July 26, 1960 to Edgecombe, illustrates such a method.

Another process is disclosed in U.S. Letters Patent No. 2,757,138 patented July 31, 1956 to Clatot et al., whereby the lubricating pad is composed of a non-abrasive combustible organic substance in a high state of division such as saw dust mixed with a highly divided lubricant such as carbon black combined with a super oxygenated substance adapted to react exothermically with the carbon at the high temperature. Such a material may be bismuth tetroxide. Suitable binders such as synthetic resin may be used to agglomerate the constituent.

However, for one reason or another all of these prior art attempts to provide the necessary lubrication for these high melting point metals have failed, with particular disadvantages centering around the inability to produce extrusions of sizable length.

It is therefore a principal object of this invention to provide a means of facilitating the lubrication of tools used in metal deforming operations such as extrusion of high melting temperature metals whereby the wear of the tools may be decreased and whereby the end product may have good surface quality.

It is an additional object of this invention to provide a means for producing such lubricating devices.

It is still another object of this invention to provide an improved method of extruding high melting temperature metals and alloys without incurring excessive wear and abrasion of the extruding assembly.

Other objects and further scope of applicability of the present invention will become apparent from the detailed description given hereinafter.

It has now been determined that the foregoing objects may be satisfied and the above-mentioned difficulties overcome by providing a new lubricating device to be used in conjunction with high temperature formation of metal materials.

This device is a pad which is placed behind the die but ahead of the metal being extruded so that the metal penetrates the pad, melts the pad which coats the surface of the hot metal as it passes through the die and thereby lubricates the interior of the die. The pad is composed of a matrix of between about 14% and about 40% high temperature fiber such as silica fiber which holds together finely divided refractory materials such as alumina or zirconia. The state of subdivision of the finely divided refractory material is less than about 100 mesh with less than 325 mesh being preferred. Among the metals and alloys which have high melting points, above 900° C., and which can be satisfactorily extruded according to the present invention are tungsten and molybdenum, but other high melting metals or alloys such as steel and steel and iron alloys, nickel and nickel alloys, and copper and copper alloys may also be successfully extruded.

The fiber component if it is in the form of silica fiber may be prepared by leaching techniques such as those disclosed in U.S. Letters Patent application Serial No. 562,722 filed February 1, 1956, now U.S. Letters Patent No. 3,092,531 to Labino which disclosure is incorporated herein by reference. Referring more specifically to the types of silica fibers useful within the scope of the instant invention, the fibers may be attained by first fusing a soft glass consisting essentially of sodium oxide and silica in the approximate weight ratio of 1:4. Such glasses soften at about 800° to 900° C. (1472° to 1652° F.) and may be readily extruded, in the fused condition, into long thin strands. These strands emanating from the extrusion equipment are subjected to a high velocity, hot gas blast which blows the glass into fibers of extremely small diameter.

The mat of blown material is normally collected on a moving belt and appears as a fluffy fibrous mass. This fibrous material is composed essentially of sodium oxide and silica, and upon boiling in dilute acid the sodium oxide is leached out of the fibers without affecting their physical form to produce a substantially pure silica fiber.

Other fibers may be used so long as they possess a sufficiently high enough melting point on the order of about 1200° F. or higher and may be illustrated by the commercial "E" glass and "475" glass. By "E" glass I mean a glass having the following approximate percentage composition. $SiO_2$ 54.3, $B_2O_3$ 8.0, $R_2O_3$ (primarily alumina) 14.8, $Na_2O+K_2O$ 0.5, CaO 17.4, MgO 4.9 and $F_2$ 0.1. U.S. Letters Patent Nos. 2,334,961 patented November 23, 1943, to Schoenlaub and 2,883,296 issued to Labino on April 21, 1959 likewise list representative "E" glass formulations. With regard to "475" glass, its composition is approximately as follows: $SiO_2$ 57.9, $B_2O_3$ 10.7, $R_2O_3$ 5.9, $Na_2O$ 10.1, $K_2O$ 2.9, CaO 2.6, MgO 0.4, BaO 5.0, ZnO 3.9 and $F_2$ 0.6 percent.

For purposes of this invention I prefer fibers having a diameter in the range of between about 0.5 and about 2.0 microns and fibers in this range between 0.5 and 1.5 microns in diameter are particularly suitable for the practice of this invention. Fibers of greater diameter are not as effective because of the difficulty in effecting a proper felting of the fibers. On the other hand, those with smaller diameters present an economical problem in that they become costly to produce.

With respect to the lubricant powder component, it may be composed of additional ingredients other than the alumina and zirconia refractories mentioned above and may include substantially pure silica powder, boro-silicate glass powder or mixtures of any of these.

The boro-silicate powder may be described as a glass of approximately 80% $SiO_2$, 13% $B_2O_5$, 2.3% $Al_2O_3$, 4% $Na_2O$.

With regard to the selection of the refractory powder, it should have a melting point higher than about 1500° F. and have a particle size distribution less than 100 mesh and preferably less than 325 mesh. It has been found that coarser materials may adversely affect the billet being extruded to the extent of scratching the surface.

The pads are prepared by slurrying the fibers and powder in an aqueous medium and filtering the liquid so as to produce a mat or matrix of fiber and powder. The powder may be employed in the range of about 60 to about 86% by weight of the pad with the remainder being the fiber matrix. The density of the pad may vary between about 4 and 20 lbs./cu. ft. with about 4 lbs./cu. ft. being preferred.

A major advantage in providing lubricating pads in accordance with the instant invention is in achieving mass and density in a pad by incorporating the powdered material, which could not be achieved by utilizing fibers alone. Additionally, this permits a more economical means of obtaining a pad. One other advantage which merits noting is that it is now possible to produce extruded materials of significant lengths on the order of 6 to 10 feet whereas heretofore it was only possible to achieve 2 foot lengths.

A more complete understanding of the invention may be obtained by reference to the following examples of operations within the scope of this invention. In these examples all parts and percentages are by weight unless otherwise indicated.

EXAMPLE I

One-quarter lb. of silica fiber having an average diameter of 1.3 microns and average length of between $\frac{1}{32}$ and $\frac{3}{4}''$ was slurried in a tank containing water. To the tank was added .75 lb. of powdered $ZrO_2$ having an average particle size of −325 mesh. The slurry was mixed and then deposited on a foraminous surface to form a felt ½" thick having 25% silica fibers and 75% $ZrO_2$. From the felt were cut circular pads 3¾" in diameter having a density of approximately 4 lbs./cu. ft. These pads were used successfully in the extrusion of both tungsten and molybdenum billets.

EXAMPLES II–XV

The same procedure outlined in Example I was repeated with variations in the amounts and composition of both the fiber and powdered lubricant. All pads performed satisfactorily in the extrusion of high melting metals and were particularly successful in permitting the extrusion of longer length than heretofore obtainable. The make-up of the pads is set out below in Table 1.

*Table 1*

HIGH MELTING TEMPERATURE LUBRICATING PADS

| Example | Fiber | Fiber size diameter, microns | Fiber percentage | Lubricant powder | Lubricant size, mesh | Lubricant percentage | Pad size, inches Thickness | Pad size, inches Diameter |
|---|---|---|---|---|---|---|---|---|
| II | Silica | 1–1.5 | 25.0 | $Al_2O_3$ | −325 | 75.0 | 1 | 4 |
| III | do | 1–1.5 | 14.0 | Silica / Boro-silicate | −100 | 64.5 / 21.5 | 1 | 4 |
| IV | do | 1.3 | 25.0 | Alumina hydrate | −325 | 75.0 | 1 | 4 |
| V | do | 1 | 25.0 | Boro-silicate | −325 | 75.0 |  | 4 |
| VI | do | 1.3 | 20.0 | Silica / Boro-silicate | −325 / −325 | 60.0 / 20.0 | ½ | 3¾ |
| VII | do | 1–1.5 | 20.0 | Silica / Boro-silicate | −100 / −100 | 40.0 / 40.0 | ½ | 3¾ |
| VIII | do | 1.3 | 20.0 | Silica / Boro-silicate | −325 / −325 | 20.0 / 60.0 | ½ | 4 |
| IX | "E" glass | 1.5 | 20.0 | Silica / Boro-silicate | −325 / −325 | 60.0 / 20.0 | ½ | 4 |
| X | do | .5 | 20.0 | Silica / Boro-silicate | −325 / −325 | 40.0 / 40.0 | ½ | 4 |
| XI | do | 1–2 | 20.0 | Silica / Boro-silicate | −325 / −325 | 20.0 / 60.0 | ½ | 4 |
| XII | do | 1.3 | 20.0 | Boro-silicate | −325 | 80.0 | ½ | 4 |
| XIII | do | 1.5 | 40.0 | do | −325 | 60.0 | ½ | 3¾ |
| XIV | "475" glass | 1–1.5 | 20.0 | do | −325 | 80.0 | ½ | 3¾ |
| XV | do | 1–1.5 | 40.0 | do | −325 | 60.0 | ½ | 3¾ |

It is believed that the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claims, when read in the light of the foregoing description.

What I claim is:

1. A method of deforming a metal workpiece in a metal shaping chamber having a die at one end and having an opening through which the workpiece is extruded comprising covering the entrance opening of said die with a glass fiber matrix pad containing between about 14% and about 40% by weight thereof of glass fiber having a melting point in excess of about 1200° F. and having an average diameter between about 0.5 and about 2.0 microns, and between about 60% and about 86% by weight thereof of a powdered refractory having a melting point in excess of 1500° F., particle size less than about 100 mesh, and selected from the group consisting of alumina, silica, zirconia, powdered glass having a high percentage of boro-silicate, and mixtures thereof.

2. A method as defined in claim 1 wherein the fiber is selected from the group consisting of silica, "E" glass, "475" glass and mixtures thereof.

3. A method as defined in claim 1 further comprising placing a heated metal work piece in the metal shaping chamber and passing it through said pad and die.

4. An infusable, heat-insulating lubricating composition adapted for interposition between the heated surface of a metal to be shaped and the shaping surfaces of the shaping assembly which comprises a glass fiber matrix pad containing between about 14% and about 40% by weight thereof of glass fibers having a melting point in excess of 1200° F. and an average diameter between about 0.5 and about 2.0 microns, and between about 60% and about 86% by weight of a powdered refractory having a melting point in excess of about 1500° F., particle size less than 100 mesh, and selected from the group consisting of alumina, silica, zirconia, and powdered glass having a high boro-silicate content, and mixtures thereof.

5. A composition as described in claim 4 wherein the powdered refractory is alumina.

6. A composition as described in claim 4 wherein the powdered refractory is silica.

7. A composition as described in claim 4 wherein the powdered refractory is zirconia.

8. A composition as described in claim 4 wherein the powdered refractory is a boro-silicate glass.

9. A composition as described in claim 4 wherein the fiber is selected from the group consisting of silica, "E" glass, "475" glass and mixtures thereof.

References Cited by the Examiner
UNITED STATES PATENTS

| | | | |
|---|---|---|---|
| 2,706,850 | 4/55 | Sejournet et al. | 207—10.1 XR |
| 2,715,765 | 8/55 | Brown | 207—10.1 XR |
| 2,731,145 | 1/56 | Kritscher | 207—10.1 |
| 3,059,769 | 10/62 | Frost | 207—10.1 |
| 3,061,093 | 10/62 | Edgecombe | 207—10.1 |
| 3,110,399 | 11/63 | Godron | 207—10.1 |

MICHAEL V. BRINDISI, *Primary Examiner.*

CHARLES W. LANHAM, *Examiner.*